United States Patent
Grotto et al.

(10) Patent No.: US 11,457,129 B2
(45) Date of Patent: Sep. 27, 2022

(54) DAMAGE RESISTANT ROTATABLE VIDEO CAMERA ASSEMBLY

(71) Applicant: VIDEOTEC S.p.A., Schio (IT)

(72) Inventors: Alessio Grotto, Schio (IT); Angelo Ribello, Schio (IT)

(73) Assignee: VIDEOTEC S.p.A., Schio (IT)

( * ) Notice: Subject to any disclaimer, the term of this patent is extended or adjusted under 35 U.S.C. 154(b) by 0 days.

(21) Appl. No.: 17/277,447

(22) PCT Filed: Sep. 20, 2019

(86) PCT No.: PCT/IB2019/057975
§ 371 (c)(1),
(2) Date: Mar. 18, 2021

(87) PCT Pub. No.: WO2020/058929
PCT Pub. Date: Mar. 26, 2020

(65) Prior Publication Data
US 2022/0038606 A1    Feb. 3, 2022

(30) Foreign Application Priority Data

Sep. 21, 2018 (IT) .................... 102018000008805

(51) Int. Cl.
*H04N 5/225* (2006.01)
*G08B 13/196* (2006.01)
(Continued)

(52) U.S. Cl.
CPC .......... *H04N 5/2252* (2013.01); *G03B 17/02* (2013.01); *G03B 17/561* (2013.01);
(Continued)

(58) Field of Classification Search
CPC .... H04N 5/225; H04N 5/2251; H04N 5/2252; H04N 5/22521; H04N 5/2253;
(Continued)

(56) References Cited

U.S. PATENT DOCUMENTS

| 2005/0206779 A1* | 9/2005 | Aoki ...................... H04N 5/335 348/373 |
| 2015/0192241 A1* | 7/2015 | Shannahan .......... F16M 11/043 |

FOREIGN PATENT DOCUMENTS

| CN | 106534637 A | * | 3/2017 | ........... H04N 5/2251 |
| CN | 106534637 A |   | 3/2017 | |

(Continued)

OTHER PUBLICATIONS

International Search Report and Written Opinion dated Nov. 18, 2019 in corresponding International application No. PCT/IB2019/057975; 13 pages.

*Primary Examiner* — Twyler L Haskins
*Assistant Examiner* — Akshay Trehan
(74) *Attorney, Agent, or Firm* — Maier & Maier, PLLC

(57) ABSTRACT

A video camera assembly, includes a movable body to house a video camera and coupled in a rotatable manner to a base body. The base body has a cavity with a base portion of the base body and a closing wall which has a seat defining a through hole. The cavity houses a shaft on the first end of which the movable body is mounted, said first end of the shaft passes through the through hole of the closing wall and is coupled to the through hole by means of a first bearing inserted in the seat. The end of the shaft opposite to the first end is supported by a rolling type second bearing, and is connected to the base body. The second bearing is inserted in an annular seat made of material which projects from the base portion of the cavity towards the closing wall.

20 Claims, 4 Drawing Sheets

(51) Int. Cl.
    *G03B 17/56*     (2021.01)
    *G03B 17/02*     (2021.01)

(52) U.S. Cl.
    CPC ... *G08B 13/1963* (2013.01); *G08B 13/19619* (2013.01); *G08B 13/19632* (2013.01); *H04N 5/2253* (2013.01); *H04N 5/22521* (2018.08)

(58) Field of Classification Search
    CPC .... H04N 5/2328; G02B 27/64; G02B 27/646; G03B 17/00; G03B 17/02; G03B 17/56; G03B 17/561; G08B 13/19617; G08B 13/19619; G08B 13/1963; F16M 11/06–14; H02K 5/16–1737
    See application file for complete search history.

(56) References Cited

FOREIGN PATENT DOCUMENTS

| | | |
|---|---|---|
| EP | 1555810 A2 | 7/2005 |
| EP | 2845052 B1 | 1/2018 |
| JP | 4312880 B2 | 12/2000 |
| KR | 101369735 B1 | 3/2014 |
| WO | 2018064802 A1 | 4/2018 |

\* cited by examiner

DAMAGE RESISTANT ROTATABLE VIDEO CAMERA ASSEMBLY

TECHNICAL FIELD

The present invention relates to the field of video cameras that can be used for example, in the field of video surveillance. The invention particularly relates to a video camera assembly comprising a box-like body and a video camera housing body that is rotatable with respect to the box-like body.

BACKGROUND

Video camera assemblies provided with rotating heads with respect to respective adjacent portions of the assembly, are known. The rotating head usually comprises a video camera. Known video camera assemblies provided with rotating head have systems configured to allow the rotation of the rotating head with respect to adjacent portions of the assembly.

A type of known video camera assembly is illustrated in Japanese Patent JP4312880B2. JP4312880B2 discloses a video camera assembly comprising a rotating head in the form of a drum-like body hinged to two adjacent symmetrical portions. Each of the symmetrical portions comprises a side shell and a side support. The side supports each correspond to a flat wall in which an oscillating joint is formed comprising a through hole, which is surrounded by a circular wall. The oscillating joint allows the rotating head to rotate with respect to the symmetrical portions.

However, the rotation support system illustrated in Japanese Patent JP4312880B2 has an articulated structure that is not capable of dealing with forces resulting from possible blows without undergoing damage, breaks, failures or dysfunctionalities of the assembly. For example, the forces resulting from a blow undergone by the video camera assembly or by the rotating head in JP4312880B2 may cause the disengagement of the rotating head from the side supports, and therefore the functionality of the oscillating joint is affected. This may occur also following blows of modest entity. In addition to the above, possible forces resulting from blows of greater entity may cause damage, breaks or failures in the oscillating joint of JP4312880B2, with the subsequent dysfunctionalities of the assembly.

Moreover, the rotation support system illustrated in Japanese Patent JP4312880B2 does not constitute a reliable solution for the rotation of the rotating head. In particular, the oscillating articulation of the rotation support system illustrated in Japanese Patent JP4312880B2 does not allow an accurate and stable rotation of the rotating head with respect to the adjacent portions.

A different technical solution is provided in Korean Patent KR101369735B1, which shows a rotating head with respect to adjacent portions of the video camera assembly, which are arranged respectively at opposite side portions of the head. The rotation of the head is allowed by means of two ball bearings housed in a respective adjacent portion with respect to the rotating head. Each bearing is engaged to a respective shaft.

The ball bearings in Korean Patent KR101369735B1 stabilize the rotation of the rotating head with respect to the technical solution shown in Japanese Patent JP4312880B2; however, the structure of the video camera assembly illustrated in Korean Patent KR101369735B1 is difficult to implement because it requires rather large spaces for housing the bearings. Large spaces usually are difficult to obtain in the box-like bodies of the video camera assemblies due to the multiplicity of components that are to be housed therein.

Moreover, the rotation support system illustrated in Korean Patent KR101369735B1 has a complex and cumbersome structure that is not capable of dealing with forces resulting from possible blows without undergoing damage, failures, breaks or dysfunctionalities of the assembly.

Finally, European Patent No. EP 2845052 proposes a support device that may be used in a video camera assembly, the device having similar features to that described in the preamble of claim 1. However, the support device proposed in EP 2845052 has a structure that is particularly complex to manufacture and assemble.

In light of the above and in particular of the complex and cumbersome structures described above, the known video camera assemblies are not capable of reacting in optimal manner to forces resulting from possible blows, for example subsequent to an attempt to tamper the video camera assembly.

In addition to the above, it is worth noting that the dysfunctionalities of known video camera assemblies, which may occur as detailed above due to forces resulting from blows, are costly because they involve additional costs necessary for replacing or servicing the video camera assembly, with the subsequent stop times of the video camera assembly (in which the video camera assembly is not operational) necessary for restoring the functionalities of the video camera assembly.

Moreover, known video camera assemblies do not have systems capable of allowing the rotation of the rotating head in a simple, accurate, reliable and effective manner.

SUMMARY

The object of the present invention is to overcome the drawbacks of the prior art.

The object of the present invention is to introduce a video camera assembly comprising a box-like body and a video camera housing body that is rotatable with respect to the box-like body, structured to resist forces resulting from possible blows, for example subsequent to an attempt to break into the video camera assembly, in an optimal manner and without undergoing damage, failures or breaks.

The object of the present invention in particular is to provide a video camera assembly structured to prevent the damaging or breaking of the components intended to allow the rotation of the video camera housing body with respect to the box-like body. In essence, the object of the present invention is to introduce a video camera assembly in which forces resulting from blows do not affect the rotation of the video camera housing body with respect to the box-like body.

A further object of the present invention is to introduce a video camera assembly comprising a box-like body and a video camera housing body which is rotatable with respect to the box-like body, which ensures a rotation of the video camera housing body with respect to the box-like body in a simple, accurate, reliable and effective manner.

It is a further object of the present invention to make available a video camera assembly that is simple to make and that simultaneously is structurally sturdy and compact, that is to say that is capable of housing the components intended to allow the rotation of the video camera housing body in the limited spaces available in the box-like body.

These and other objects of the present invention are achieved by means of a video camera assembly incorporating the technical features of the appended claims, which form an integral part of the present description. Moreover, the invention may be in agreement with the technical features hereinbelow described, which may be considered individually from one another or in any combination thereof.

In one embodiment, the video camera assembly comprises a movable body intended to house a video camera and coupled in a rotatable manner to a base body. The base body has a cavity defined by a base portion of the base body and a closing wall which has a seat defining a through hole. The cavity houses a shaft on the first end of which the movable body is mounted. Said first end of the shaft passes through the through hole of the closing wall and is coupled to the through hole by means of a first bearing inserted in the seat. The end of the shaft opposite to the first end is supported by a second bearing, which is of the rolling type and is connected to the base body. The second bearing is inserted in an annular seat made of elastically deformable material which projects from the base portion of the cavity towards the closing wall. The first bearing is of the sliding type and comprises an annular shoulder and a body which projects axially from the shoulder, which is adapted to abut against the closing wall when the first bearing is inserted in the seat. The closing wall is made of an elastically deformable material and is removably fixed to a peripheral surface of the base portion.

According to such technical solution, the video camera assembly has an elastic (not rigid) structure capable of absorbing and transmitting forces, such as forces resulting from blows, without being damaged or breaking. In particular, the components that are protected against damage and breaking are the shaft and the other components that allow the rotation of the movable body with respect to the base body, such as the bearings and the constraint elements connecting the shaft to the movable body. By being elastically deformed, the closing wall prevents damage or breakages of the whole shaft rotation support structure, and the transfer of forces resulting from blows is more gradual and not traumatic for such support structure at the rotation of the shaft. Moreover, the energy resulting from a blow is conveyed and absorbed by the deformable wall, which dissipates this part of the energy. In this way, the more rigid portion, i.e. the base portion, is allowed to absorb a smaller quantity of energy such as not to cause structural damage.

An additional advantage is that by providing rotation support elements that are different from one another, i.e. bearings of the rolling and sliding types, it is possible to ensure an optimal resistance of the assembly to forces, such as forces resulting from blows, having multi-directional components. The assembly provided with different types of bearings allows for example, an optimal resistance to force components of radial and axial types. In this way, the bending motions acting on the shaft are prevented or minimised, thus avoiding the shaft from undergoing permanent deformations.

Moreover, thanks to the provision of two bearings, it is possible to support the shaft while it rotates in an optimal manner. Moreover, it is possible to minimise the rotation frictions of the shaft.

In particular, the bearings allow keeping the proper positioning and the centering of the shaft with respect to the rotation axis in a simple and effective manner. The shaft therefore is capable of translating longitudinally following a blow in at least one operative condition of the video camera assembly without causing damage to the assembly itself.

The assembly consisting of the rolling bearing and the annular seat advantageously substantially acts as an elastic system, in particular adapted to absorb the energy of stresses having a radial component with respect to the axis of the shaft.

Forming the seat for the sliding bearing directly in the elastically deformable closing wall advantageously allows omitting an additional component dedicated to housing and supporting the sliding bearing.

Finally, the sliding bearing provides the following advantages with respect to using a further rolling bearing:
- the sliding bearing is quieter (it involves less noise) with respect to a further rolling bearing;
- the sliding bearing has a smaller overall radial dimension with respect to a further rolling bearing and therefore allows a more compact shaft rotation support structure;
- the sliding bearing has can be mounted more easily than a further rolling bearing;
- the sliding bearing usually is less costly than a further rolling bearing.

In one embodiment, the base body further comprises a seat configured to house the movable body in a rotatable manner, the seat having a shape at least partially complementary with a shape of the movable body.

This shape provides an additional protection for the movable body with respect to contact with foreign bodies and/or intense air flows.

In one embodiment, the movable body is fixed to the shaft by means of a plurality of constraint elements coupled to the first end of the shaft exposed through the through hole defined by the seat formed in the closing wall.

Thanks to this solution, the assembly has a particularly compact structure and in particular, the movable body is fixed to the shaft in a simple and reliable manner.

In one embodiment, the wall comprises a slot configured to slidably receive a pin projecting from the movable body when the movable body is mounted to the shaft, opposite ends of the slot defining limit stops of a rotation of the movable body.

In this manner, it is possible to control the extension of the tilt rotation of the movable body in a simple and reliable manner.

In one embodiment, an outer surface of the body of the first bearing and a surface of the seat are at least partially formed complementary shaped.

In this manner, the insertion and coupling between the sliding bearing and the seat are more reliable.

In one embodiment, the rolling bearing comprises one among a ball bearing, a roller bearing and a gear bearing. Additionally or alternatively, the sliding bearing comprises one between a bushing and a brass bearing.

In one embodiment, the second sliding bearing is configured to allow an abutment of the shaft adapted to keep the alignment of the shaft.

This contributes to keeping the shaft in the proper orientation and prevents the free bending of the shaft and therefore, an increased rotation stability of the shaft, and therefore of the video camera housing body.

Advantageously, the movable body houses a video camera and preferably additional components to ensure a proper operation thereof.

In one embodiment, the sliding bearing is made of elastically deformable material.

Advantageously, the sliding bearing may be elastically deformed following a blow in order to elastically dissipate the energy subsequent to a blow. Thanks to the elastic deformability of the sliding bearing and of the portion of the box-like body adjacent thereto, breakages or failures of the components detailed above are therefore avoided. Moreover, the transfer of forces resulting from blows is more gradual and is not traumatic for the shaft rotation support structure, and therefore for the video camera assembly.

In addition, the elastic deformability of the elastically deformable portion and the elastic deformability of the sliding bearing cooperate to prevent damage or breakages of the shaft rotation support structure. Advantageously, the transfer of forces resulting from blows is more gradual and is not traumatic for the shaft rotation support structure.

The sliding bearing preferably is made of polymeric or plastic material, even more preferably self-lubricating, such as a polymeric material loaded with solid lubricants.

In one embodiment, the annular seat is formed in a support element removably coupled to the base portion in the cavity. The support element of the rolling bearing preferably has a substantially discoidal shape.

This structure is simple to make and allows a simple mounting of the video camera assembly. Moreover, the discoidal shape allows uniformly dispersing stresses having a radial component with respect to the axis of the shaft.

Additionally or alternatively, the support element is made of metallic material, preferably anticorodal aluminium AL 6082, while the convex portion may be made of metal, preferably die-cast aluminium AL EN AB 46100. Again, the elastically deformable portion preferably is made of polymeric material, preferably ASA-PC.

Thanks to the selection of one or more of these materials, it is possible to obtain a particularly sturdy and reliable assembly capable of resisting mechanical stresses and characterized by a particularly lengthy useful life.

In one embodiment, the shaft comprises two or more portions having different sizes (width, length and/or height). Preferably, the first bearing and the second bearing are engaged to adjacent portions of the shaft.

This solution provides a decidedly compact shaft rotation support structure capable of being housed in the small spaces available in the box-like body of the video camera assembly.

In particular, the advantages of having a compact structure consist in minimising the space necessary for housing the rotation support elements and the possibility of having a single box-like body that supports the rotation of the shaft. This advantage is particularly apparent when taking into consideration document KR101369735B1, which has a non-compact structure provided with two ball bearings, each of which is arranged at a respective hemispherical portion of the video camera assembly, opposite with respect to the video camera.

In one embodiment, the base body constitutes a static portion of the video camera assembly.

In one embodiment, the video camera assembly comprises a swivel system configured to rotate and/or orientate the video camera on two axes that are orthogonal to the rotation axis of the shaft and are orthogonal to each other.

In one embodiment, the movable body has an at least partially spherical shape.

In one embodiment, the base body comprises a portion with elongated shape developing along a main direction. The rotation axis is orthogonal to the main direction.

In one embodiment, the base portion develops close to or at an end of the portion with elongated shape.

In one embodiment, the base portion and the seat for the movable body develop close to or at a same end of the portion with elongated shape.

A different aspect of the present invention proposes a use of the video camera assembly within the field of video surveillance.

A different aspect of the present invention proposes a device for allowing the rotation of a movable body of a video camera assembly. The device comprises a base body which has a cavity defined by a base portion of the base body and a closing wall which has a seat defining a through hole. The cavity houses a shaft on the first end of which the movable body is mounted. Said first end of the shaft passes through the through hole of the closing wall and is coupled to the through hole by means of a first bearing inserted in the seat. The end of the shaft opposite to the first end is supported by a second bearing, which is of the rolling type and is connected to the base body. The second bearing is inserted in an annular seat made of elastically deformable material which projects from the base portion of the cavity towards the closing wall. The first bearing is of the sliding type and comprises an annular shoulder and a body which projects axially from the shoulder, which is adapted to abut against the closing wall when the first bearing is inserted in the seat. The closing wall is made of elastically deformable material and is removably fixed to a peripheral surface of the base portion.

The device of the preceding aspect may have the technical features described above and has the advantages described above with reference to the similar technical features.

In one embodiment, a video camera assembly is provided comprising such device to allow a movable body. The movable body houses a video camera and is rotatably engaged to the base body to rotate with respect thereto about a rotation axis.

The video camera assembly above may have the technical features described above and has the advantages described above with reference to the similar technical features.

Further features and objects of the present invention shall be more apparent from the following description.

BRIEF DESCRIPTION OF THE DRAWINGS

The invention is described hereinbelow with reference to certain examples provided by way of non-limiting example and illustrated in the accompanying drawings. These drawings illustrate different aspects and embodiments of the present invention and reference numerals illustrating structures, components, materials and/or similar elements in different drawings are indicated by similar reference numerals, where appropriate.

DETAILED DESCRIPTION OF THE EMBODIMENTS

Figure 1:
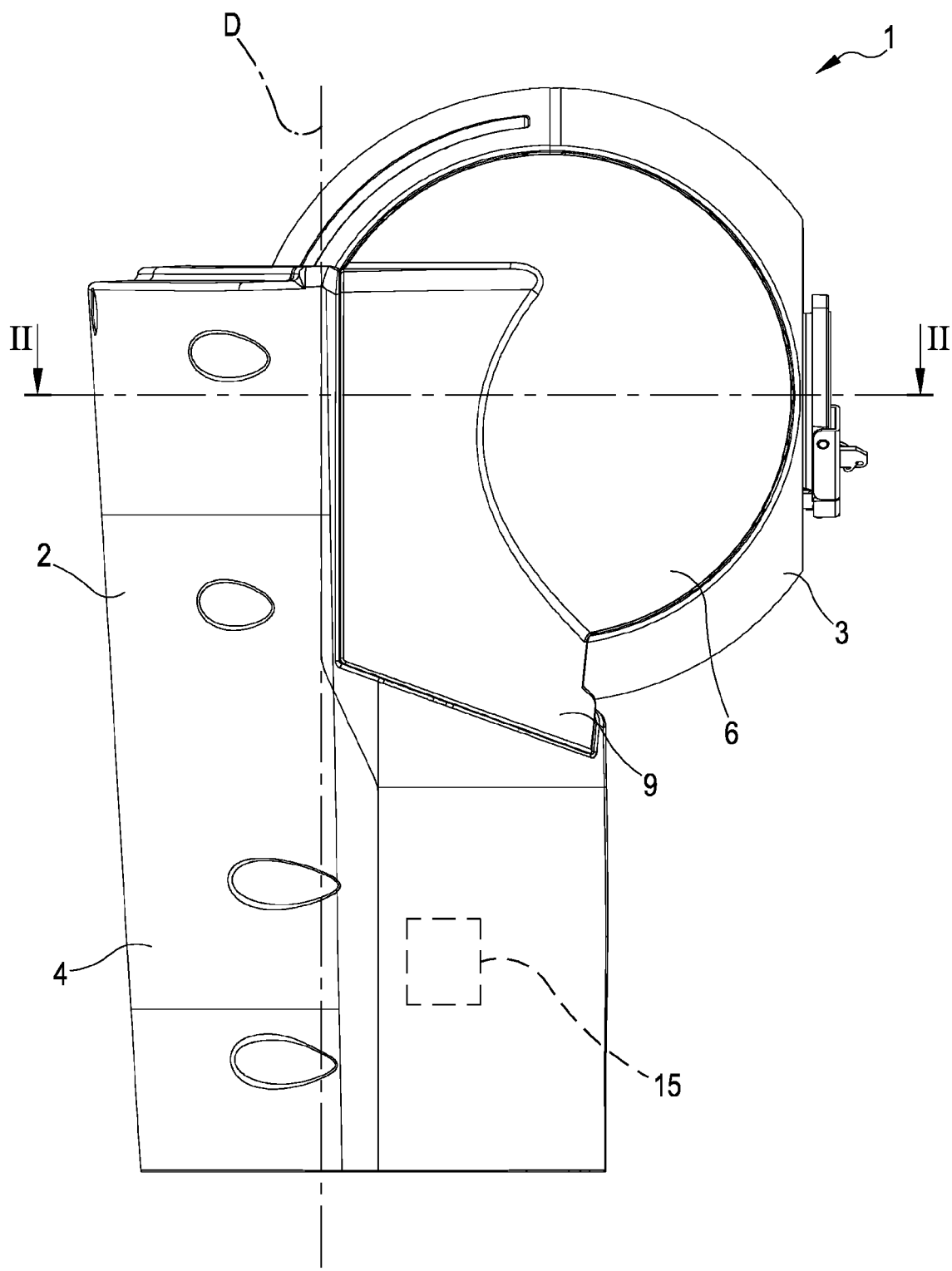
FIG. 1 is a view of the video camera assembly according to an embodiment of the present invention.

While the invention is susceptible to various modifications and alternative constructions, certain preferred embodiments are shown in the drawings and are described hereinbelow in detail. It is in any case to be noted that there is no intention to limit the invention to the specific embodiment illustrated rather on the contrary, the invention intends covering all the modifications, alternative and equivalent constructions that fall within the scope of the invention as defined in the claims.

The use of "for example", "etc.", "or" indicates non-exclusive alternatives without limitation, unless otherwise indicated. The use of "includes" or "comprises" means respectively "includes, but not limited to", and "comprises, but not limited to", unless otherwise indicated.

The use of terms such as "upper", "at the top", "bottom", "at the bottom", "side", "at the side", "horizontal", "horizontally", "vertical", "vertically", "front", "frontally", "rear", "at the rear" and the like, refers to the spatial orientation that the video camera assembly according to the present invention normally takes on in operative conditions or conditions of use. A possible spatial orientation that the video camera assembly according to the present invention may take on in operative conditions is illustrated for example, in FIG. 1.

FIG. 1 is a view of a video camera assembly 1 according to an embodiment of the present invention. The video camera assembly 1 comprises a box-like body 2, which serves as base body of the assembly, and a video camera housing body 3, which serves as movable body of the assembly. The video camera housing body 3 is rotatably engaged to the box-like body 2, while the box-like body 2 constitutes the static part of the video camera assembly 1. The rotatable engagement of the video camera housing body 3 to the box-like body 2 is described in detail below.

As illustrated in FIG. 1, the box-like body 2 has a portion 4 with elongated shape developing along a main direction D. In operating conditions of the video camera assembly 1, the portion 4 with elongated shape may be used for connecting or constraining the video camera assembly 1 to a support structure, such as a pole. An example of operating conditions of the video camera assembly 1 comprises the use of the video camera assembly 1 in the field of video surveillance of environments.

The box-like body 2 has a wall 5 and a portion 6 defining a cavity 7 at an end of the portion 4 with elongated shape. In other words, the cavity 7 substantially is a camera configured to house components of the video camera assembly 1 that allow moving the video camera housing body 3. As illustrated in the accompanying drawings, the portion 6 defining the cavity 7 and the wall 5 may develop at an upper end of the portion 4 with elongated shape.

Figure 4:
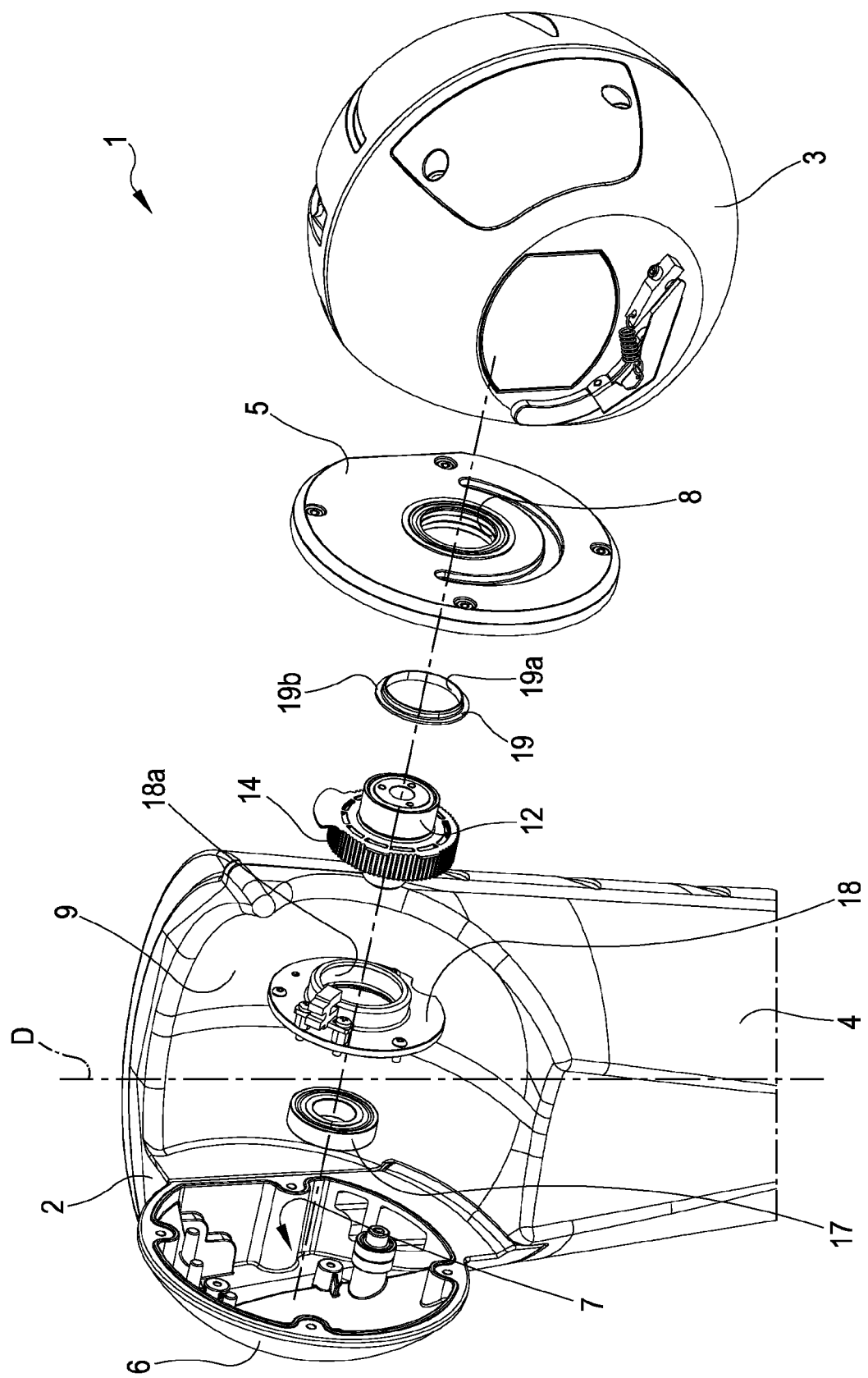
FIG. 4 is an exploded view of certain components of the video camera assembly of FIG. 1.

As illustrated in FIG. 4, the base portion 6 defining the cavity 7 preferably has a substantially spherical-cap shape, defining a convexity. It is understood that the portion 6 defining the cavity 7 may have a preferably convex shape, alternative to the spherical-cap shape, for example a parallelepiped shape or an alternative shape of solid of revolution, such as a conical or frustoconical shape, or any alternative shape adapted to define the cavity 7 therein.

Solid of revolution within the context of the present description means a solid provided with symmetry of revolution.

The wall 5 is engaged to the portion 6 defining a cavity 7 to laterally delimit the cavity 7, the part 5 preferably is fixed to a peripheral surface, which constitutes a free edge, of the portion 6. As illustrated for example in FIG. 4, the wall 5 has a seat 8, the technical function of which is described in the continuation of the present description. The seat 8 preferably defines a conveniently shaped through hole (see FIG. 4).

Figure 3:
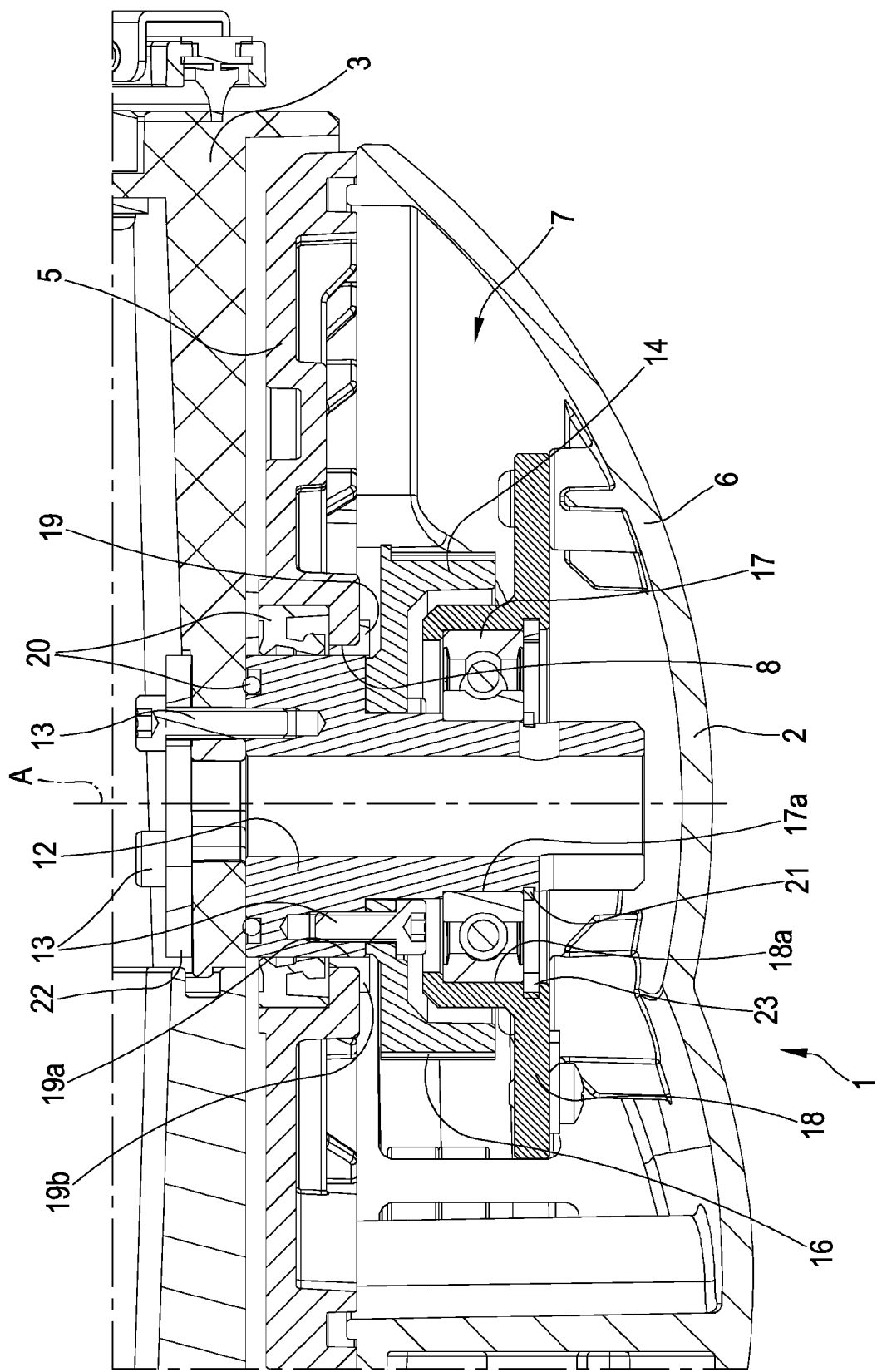
FIG. 3 is a detailed view of the area of FIG. 2, enclosed in a dotted line.

In the embodiment considered, in particular as shown in FIG. 3, the wall 5 comprises a slot configured to slidingly receive a pin (not shown) protruding from the video camera housing body 3 when the video camera housing body 3 is mounted on the shaft 12, as described below. In particular, the pin protruding from the video camera housing body is configured to abut against the ends of the slot so as to define a limit position of the tilt rotation of the video camera housing body 3 during the operation of the video camera assembly.

According to a preferred embodiment of the present invention, the wall 5 is made of elastically deformable material, such as plastic or polymeric material, such as for example, an ASA-PC mixture. The portion 6 defining a cavity 7 is made of more rigid material with respect to the material in which the wall is made, for example made of metallic material, preferably aluminium.

Providing the wall 5 made of elastically deformable material allows absorbing, and subsequently cushioning, components of force resulting from blows undergone by the video camera assembly 1 in an optimal manner and in particular, without undergoing structural failures or damage.

As illustrated in the embodiment illustrated in the accompanying drawings, and in particular as shown in FIG. 4, the wall 5 may have a substantially discoidal shape. It is understood that in alternative embodiments (not illustrated in the accompanying drawings), the wall 5 may have an alternative shape to the substantially discoidal one, such as a further solid of revolution shape.

As illustrated in FIG. 4, the box-like body 2 has an guide portion or seat 9 at the same end as the portion 4 with elongated shape in which the portion 6 defining the cavity 7 and the wall 5 develops. The guide portion 9 is structured to house the video camera housing body 3 (see FIG. 2 and FIG. 4).

As illustrated in the accompanying drawings, the guide portion 9 houses the video camera housing body 3 and has a shape adapted to allow the rotation of the video camera housing body 3 with respect to the box-like body 2.

Figure 2:
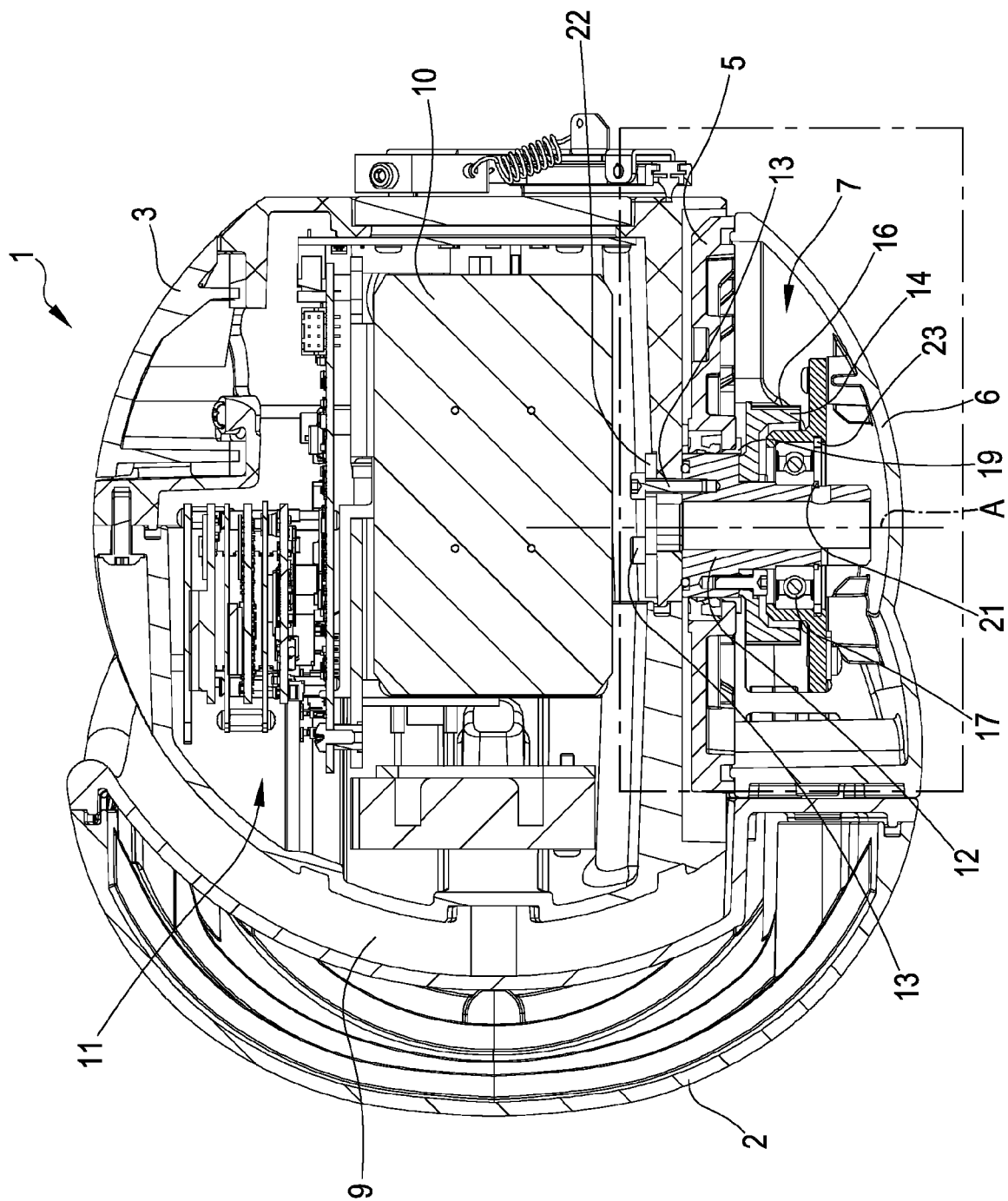
FIG. 2 is a section of the video camera assembly of FIG. 1, shown according to the sectioning plane II-II depicted in FIG. 1.

Preferably, the guide portion 9 has a shape that is at least partially complementary to the video camera housing body 3. Advantageously, such shape of the guide portion 9 allows the rotation of the video camera housing body 3 with respect to the box-like body 2. As illustrated in FIG. 2, the guide portion 9 has an at least partially spherical shape defining a concavity. It is understood that other concave shapes of the guide portion 9 may be possible, such as for example a conical or frustoconical shape or similar solid of revolution shapes adapted to allow the rotation of the video camera housing body 3 with respect to the box-like body 2.

The video camera housing body 3 is housed at the guide portion 9 without contact with the guide portion 9 (see FIG. 2). The absence of contact between the video camera housing body 3 and guide portion 9 advantageously allows a free rotation of the video camera housing body 3 with respect to the box-like body 2.

The video camera housing body 3 may be made of metallic material, such as aluminium formed by means of a die casting process.

Similarly to that described above with reference to the guide portion 9, the video camera housing body 3 preferably has a shape that is at least partially complementary with respect to the guide portion 9. Advantageously, such shape of the video camera housing body 3 allows the rotation thereof with respect to the box-like body 2. As illustrated in FIG. 2, the video camera housing body 3 has a shape that is at least partially spherical defining a convexity intended to be housed without contact at the concavity defined by the guide portion 9. As illustrated in FIG. 4, the video camera housing body 3 preferably has a substantially spherical-cap shape. It is understood that other convex shapes of the video camera housing body 3 may be possible, such as for example a conical or frustoconical shape or similar solid of revolution shapes adapted to allow the rotation of the video camera housing body 3 with respect to the box-like body 2.

The video camera assembly 1 further comprises a video camera 10 (depicted schematically in the accompanying drawings) and an electronic control system 11 for controlling the operation of the assembly and of possible auxiliary components connected thereto (not illustrated, such as for example a lighting unit). As illustrated in FIG. 2, the video camera 10 and the electronic control system 11 are arranged in the video camera housing body 3.

The rotation of the video camera housing body 3 with respect to the box-like body 2 is allowed by a shaft 12. The shaft 12 allows the tilt movement of the video camera housing body 3 with respect to the box-like body 2. As illustrated in FIG. 3, the video camera assembly 1 according to the present invention provides for the shaft 12 to develop mainly in the cavity 7 along a direction defining a rotation axis A.

The shaft 12 is axially blocked by a first Seeger ring 21. The first Seeger ring 21 develops annularly about the axis A. It is understood that in alternative embodiments (not illustrated in the accompanying drawings), a different stop element of the axial movement of the shaft 12 configured to block axial movements of the shaft 12 may be provided alternatively to the Seeger ring 21.

The shaft 12 is engaged to the video camera housing body 3 by means of constraint elements 13. The constraint elements are engaged to the video camera housing body 3 and to the shaft 12 and are configured to make the video camera housing body 3 integral in rotation to the shaft 12. As illustrated in detail in FIG. 3, the engagement between shaft 12 and video camera housing body 3 is defined close to the wall 5. The constraint elements 13 may be of the threaded type. In order to allow an engagement of the constraint elements 13 to the video camera housing body 3, the video camera assembly 1 may provide a reinforcing element 22. The reinforcing element 22 preferably is made of metallic material having a greater mechanical resistance with respect to the aluminium in which the video camera housing body 3 is made. Advantageously, the reinforcing element 22 is configured to distribute the strains resulting from a blow in homogeneous manner in the video camera housing body 3. As illustrated in FIGS. 2 and 3, the reinforcing element 22 is placed in contact with the video camera housing body 3 at a portion thereof adapted to come into contact with the end of the shaft 12 exposed through the through hole defined by the seat 8 and crossed by the constraint elements 13. In the embodiment illustrated in detail in FIG. 3, the constraint elements consist of screws 13. Alternatively, alternative constraint elements 13 may be provided with respect to the screws, such as for example, tabs or keys or splines housed in convenient seats or hollows made on the video camera housing body and on the shaft, or grooves conveniently made on the video camera housing body 3 and on the shaft 12 (grooved connection), or toothed elements conveniently made on the video camera housing body 3 and on the shaft 12 (toothed connection), or further constraint elements 13 capable of making the video camera housing body 3 integral in rotation with the shaft 12. Moreover, the reinforcing element 22 may comprise a plate provided with through holes shaped to receive corresponding constraint elements 13.

The video camera assembly 1 comprises a swivel system (not illustrated in detail) configured to allow a rotation of the video camera 10 along a vertical axis (pan movement) and a rotation of the video camera along a horizontal axis (tilt movement). The vertical axis about which the video camera 10 may rotate in operative conditions of the video camera assembly 1 substantially is parallel to the main development direction D of the portion 4 with elongated shape. As illustrated in FIG. 3, the swivel system further comprises a pulley 14, a motor 15 (depicted schematically in the accompanying drawings) and a belt 16. The motor 15 and the belt 16 are housed in the portion 4 with elongated shape, while the pulley 14 is housed in the portion 6 defining the cavity 7. The motor 15 may be for example, an electric motor. The pulley 14 is engaged to the shaft 12 and is configured to guide the shaft 12 in rotation. Shaft 12 and pulley 14 are made integral in rotation by conveniently provided constraint elements 13, which may be of the type described above in relation to the engagement between shaft 12 and video camera housing body 3. By way of example, the detail in FIG. 3 shows a constraint element 13 of threaded type.

The belt 16 is engaged to the motor 15 and the pulley 14 and is configured to transfer the rotary motion coming from the motor 15 to the pulley 14. Given that the shaft 12 is integral with the pulley 14, the rotary motion is transferred by the pulley 14 to the shaft 12, and therefore to the video camera housing body 3, in operative conditions of the motor 15. The video camera housing body 3 may therefore rotate about the rotation axis A.

As illustrated in the preferred embodiment of the present invention depicted in the accompanying drawings, in order to allow an optimal rotation of the shaft 12, the video camera assembly 1 comprises a ball bearing 17 arranged in the portion 6 defining the cavity 7. As illustrated in the accompanying drawings, the video camera assembly 1 further provides a support element 18 for housing the ball bearing 17 at an annular seat 18a in the example in the drawings, which delimits a through hole, and for supporting it. The support element 18 contributes to the elasticity of the video camera assembly 1 which allows it to absorb the energy resulting from blows. In the embodiment shown in the accompanying drawings, the support element 18 has a substantially discoidal shape; however other alternative shapes of the support element 18 are possible, such as further shapes of a solid of revolution. The annular seat 18a preferably is adapted to be coupled to the ball bearing 17 for the whole axial development thereof; in the example considered, the annular seat 18a protrudes from the portion 6 of the cavity 7, towards the wall 5.

The support element 18 preferably is made of aluminium, such as anticorodal aluminium AL 6082. The support element 18 preferably is screwed to the portion 6 defining a cavity 7, which preferably is made by die cast AL EN AB 46100 aluminium.

The ball bearing 17 is axially blocked by a second Seeger ring 23. The second Seeger ring 23 develops annularly about the axis A and is concentric with the first Seeger ring 21. The second Seeger ring 23 has a greater diameter with respect to a diameter of the first Seeger ring 21. It is understood that in alternative embodiments (not illustrated in the accompanying drawings), a different stop element of the axial movement of the ball bearing 17 configured to block axial movements of the ball bearing 17 may be provided alternatively to the Seeger ring 23.

As illustrated in detail in FIG. 3, the shaft 12 is engaged to the ball bearing 17 at a through hole 17a of the ball bearing 17. The ball bearing 17 allows the rotation of the shaft 12 with respect to the box-like body 2 and provides an abutment thereto adapted to define the orientation of the shaft 12. The ball bearing 17 preferably is of the axial type and may be made of steel.

It is understood that in alternative embodiments (not illustrated in the accompanying drawings), another bearing of the rolling type (rolling bearing) may be provided alternatively to the ball bearing 17, such as a roller bearing or a gear bearing or an alternative rotation support element.

The video camera assembly 1 according to the present invention further comprises a sliding type bearing 19 (sliding bearing). As illustrated in the exploded view of FIG. 4, in the preferred embodiment of the invention, the sliding type bearing 19 is in the form of a bush. It is however understood that in alternative embodiments (not illustrated in the accompanying drawings), another type of sliding bearing may be used alternatively to the bush 19, such as a bushing made of polymeric or metallic material with bush shape, or an alternative rotation support element.

As illustrated in detail in FIG. 3, the bush 19 is housed at the seat 8 of the wall 5 and develops in the cavity 7. FIG. 3 and FIG. 4 illustrate a wall having the shape of a support disc 5, which seat 8 houses and supports the bush 19. Advantageously, to facilitate the engagement of the bush 19 in the seat 8, an outer surface of the bush 19 and a surface of the seat 8 defining the through hole may be conveniently shaped. The outer surface of the bush 19 and the surface of the seat 8 defining the through hole preferably may be at least partially complementary shaped. The bush 19 and the wall 5 constitute static portions of the video camera assembly 1 with respect to which the video camera housing body 3, the shaft 12 and the pulley 14 may rotate. In particular, the shaft 12 remains exposed through the through hole defined by the seat 8 and is free to rotate, sliding on the bush 19.

As illustrated in FIG. 4, the bush 19 has a shape of a solid of revolution. The bush 19 comprises a substantially cylindrical body or neck 19a provided with a through hole, at which the shaft 12 is engaged. The bush 19 also has a shoulder 19b developing without interruption with respect to the substantially cylindrical body 19a. The shoulder 19b develops without interruption circumferentially with respect to the through hole. The shoulder 19b defines a contact surface with a substantially flat surface of the wall 5 developing circumferentially about the seat 8. As illustrated in detail in FIG. 3, in assembled conditions of the video camera assembly 1, the shoulder 19b is in contact with the substantially flat surface of the wall 5 and the substantially cylindrical body 19a is in contact with the seat 8.

The bush 19 preferably is of the monolithic type. In other words, the bush 19 preferably is a single piece.

From a functional viewpoint, the bush 19 is configured to support the rotation of the shaft 12. The bush 19 also provides an abutment for the shaft 12 adapted to keep the shaft 12 aligned and to prevent a free bending thereof.

According to the preferred embodiment of the present invention, the bush 19 is made of elastically deformable material, such as polymeric or plastic material with a low coefficient of friction, preferably self-lubricating (for example polymers loaded with solid lubricants, with PTFE, etc.), such as polymers included under the trade name Iglidur®.

Providing the sliding type bearing 19 made of elastically deformable material is particularly advantageous because it allows absorbing components of force resulting from blows undergone by the video camera assembly 1 without failures or breakages.

Moreover, given that the bush 19 is made of elastically deformable material, it at least partially absorbs and transmits components of force, such as components of force resulting from blows, to at least one portion of the box-like body 2, such as the wall 5 (or vice versa).

Advantageously, providing the sliding type bearing 19 and the wall 5 made of elastically deformable material allows both to be elastically deformed following a blow. Moreover, given that the bearing 19 is of the sliding type and the wall 5 is made of elastically deformable material, they are structured to mutually transfer and jointly absorb the forces resulting from a blow.

In addition to that above, given that the sliding type bearing 19 is supported by the wall 5, they are in close contact with each other and therefore are structured to elastically react in a joint manner and cooperating with forces resulting from a blow, by mutually exchanging components of the forces and elastically dissipating the energy resulting from the blow in an optimal and effective manner.

By way of example, provided below are possible dynamics of a possible blow undergone by the video camera assembly 1 at the video camera housing body 3, resulting for example, from an attempt to break into the video camera assembly 1. The video camera housing body 3 undergoes a blow; the forces resulting from the blow in the first instance are cushioned by the video camera housing body 3. By cushioning the blow, the video camera housing body 3 bends or flexes; the components of force resulting from the blow are therefore absorbed by the bush 19 and by the wall 5 housing the bush 19. Given that they are made of elastically deformable material, the bush 19 and the wall 5 absorb the components of force resulting from the blow, thus being elastically deformed, without undergoing permanent deformations and therefore without undergoing failures, damage or breaks. From a functional viewpoint, the assembly consisting of the wall 5 housing the bush 19 and of the bush 19 substantially acts as a spring system capable of absorbing the energy resulting from the blow, in particular associated with a stress aligned with the axis A of the shaft 12, and of dissipating it, thus being elastically deformed.

Advantageously, the stresses that propagate along the shaft 12 following the blow are transferred to the ball bearing 17 and to the support element 18 supporting it, which elastically bend, in turn damping the stresses without undergoing permanent deformations and therefore without undergoing failures, damage or breaks.

From a functional viewpoint, the assembly consisting of the ball bearing 17 and the support element 18 substantially acts as an elastic system, in particular adapted to absorb the energy of stresses having a radial component with respect to the axis A of the shaft 12.

Summarising, the assembly consisting of the wall 5 and of the bush 19 and the assembly consisting of the ball bearing 17 and of the support element 18 cooperate to absorb the energy resulting from the blow and to dissipate it, avoiding permanent deformations in the video camera assembly 1.

The video camera assembly 1 therefore has a non-rigid structure provided with the elasticity necessary to absorb the forces resulting from the blow without undergoing failures, damage or breaks. In this way, the breaking or damage of the shaft 12 and of the constraint elements 13 is avoided between the shaft 12 and the video camera housing portion 3. The sliding type bearing 19 may also be of radial type, that is to say that it may be configured to support components of radial force. Providing a sliding type bearing 19 of radial type therefore allows preventing or minimising bends of the shaft due to components of force of radial type. Moreover, providing a sliding type bearing 19 of radial type combined with a rolling type bearing 17 of axial type for supporting the rotation of the shaft 12 is particularly advantageous because it allows supporting both components of force of axial type (by means of the rolling type bearing 17, such as a ball bearing) and components of force of radial type (by means of the sliding type bearing 19, such as a bush) in an optimal manner.

With regard to the mutual positioning between bearings 17, 19 and shaft 12, it is worth noting that the shaft 12 is engaged to the ball bearing 17 and to the bush 19 at respective adjacent portions of the shaft 12 itself. In the embodiment considered, each portion of the shaft 12 has a cylindrical shape characterized by a respective diameter, for example adapted to be engaged with a corresponding component such as the bearings 17 and 19 or the pulley 14. Providing for the shaft to be engaged to the ball bearing 17 and to the sliding type bearing 19 at adjacent portions of the shaft 12 is particularly advantageous because it provides a compact structure, which allows arranging the components intended to allow the rotation of the shaft, and in particular the bearings 17, 19, so as to optimize the limited space available in the cavity 7. Preferably, the portion of the shaft 12 at which the sliding type bearing 19 is engaged has a greater diameter with respect to a diameter of the portion at which the ball bearing 17 is engaged. As illustrated in detail in FIG. 3, the mutual engagement between shaft 12 and bearings 17, 19 is achieved in such manner that the ball bearing 17 is interposed between the portion 6 defining the cavity 7 and the sliding bearing 19.

Moreover, one or more additional elements may be coupled to the shaft 12 between the portion in which the ball bearing 17 is coupled to the shaft 12 and the portion in which the bush 19 is coupled to the shaft 12. For example, in the example in FIGS. 2 to 4, the pulley 14 is coupled to the shaft 12 between the ball bearing 17 and the bush 19. Advantageously, this arrangement allows elastically absorbing also the stresses generated by the activation of the pulley 14 during the operation of the video camera assembly 1.

The video camera assembly 1 may also comprise one or more gaskets 20 intended to prevent the passage of fluid. As illustrated in detail in FIG. 3, the gaskets 20 may be arranged about the rotation axis A of the shaft 12.

The video camera assembly 1 may also comprise the electronic components necessary to control, manage and optimize the operation of the video camera assembly, for example in terms of managing and optimizing the orientation of the video camera 10, of the swivel system 11 and of managing and controlling the operation of the motor 15. The electronic components may be partly housed in the box-like body 2, for example at the portion 4 with elongated shape, and partly in the video camera housing body 3.

The video camera assembly 1 may also comprise convenient cabled or wireless connections necessary for allowing it to operate within a video surveillance system.

In conclusion, any materials and also any contingent shapes and sizes may be used, depending on the specific implementation needs, without departing from the scope of protection of the following claims.

The invention claimed is:

1. A video camera assembly, comprising a movable body to house a camera and that is rotatably coupled to a base body,
the base body has a cavity defined by a base portion of the base body and a closing wall which has a seat defining a through hole,
wherein the cavity houses a shaft on a first end of which the movable body is mounted, said first end of the shaft passing through the through hole of the closing wall and being coupled to said through hole by means of a first bearing inserted in the seat, and
the end of the shaft opposite to the first end is supported by a second bearing, said second bearing being a rolling bearing and being connected to the base body,
wherein
the second bearing is inserted in an annular seat made of elastically deformable material which projects from the base portion of the cavity towards the closing wall,
the first bearing is a sliding bearing and comprises an annular shoulder and a body which projects axially from the annular shoulder, said annular shoulder being adapted to abut against the closing wall when the first bearing is inserted in the seat, and
the closing wall is made of an elastically deformable material which can be removably fixed to a peripheral surface of the base portion.

2. The video camera assembly according to claim 1, wherein the base body further comprises a base body seat configured to house the movable body in a rotatable manner, the base body seat having a shape at least partially complementary with a shape of the movable body.

3. The video camera assembly according to claim 2, wherein the movable body is fixed to the shaft through a plurality of constraint elements coupled to the first end of the shaft exposed through the through hole defined by the seat formed in the closing wall.

4. The video camera assembly according to claim 2, wherein the wall comprises a slot configured to slidably receive a pin projecting from the movable body when the movable body is mounted on the shaft, opposite ends of the slot defining limit stops of a rotation of the movable body.

5. The video camera assembly according to claim 2, wherein an outer surface of the body of the first bearing and a surface of the seat are formed at least partially complementary shaped.

6. The video camera assembly according claim 2, wherein the second bearing comprises one among a ball bearing, a roller bearing, and a gear bearing, and wherein the first bearing includes one between a bushing and a brass bearing.

7. The video camera assembly according to claim 2, wherein the first bearing is made of a self-lubricating polymeric material.

8. The video camera assembly according to claim 1, wherein the movable body is fixed to the shaft through a plurality of constraint elements coupled to the first end of the shaft exposed through the through hole defined by the seat formed in the closing wall.

9. The video camera assembly according to claim 1, wherein the closing wall comprises a slot configured to slidably receive a pin projecting from the movable body when the movable body is mounted on the shaft, opposite ends of the slot defining limit stops of a rotation of the movable body.

10. The video camera assembly according to claim 1, wherein an outer surface of the body of the first bearing and a surface of the seat are formed at least partially complementary shaped.

11. The video camera assembly according to claim 1, wherein the second bearing comprises one among a ball bearing, a roller bearing, and a gear bearing, and wherein the first bearing includes one among a bushing and a brass bearing.

12. The video camera assembly according to claim 1, in which the movable body houses a video camera.

13. The video camera assembly according to claim 1, wherein the first bearing is made of an elastically deformable material.

14. The video camera assembly according to claim 13, wherein the first bearing is made of polymeric material loaded with solid lubricants.

15. The video camera assembly according to claim 1, wherein the first bearing is made of polymeric or plastic material, and is self-lubricating.

16. The video camera assembly according to claim 1, wherein the annular seat is formed in a support element removably coupled to the base portion inside the cavity.

17. The video camera assembly according to claim 16, wherein the support element is made of metallic material, wherein the metal is anticorodal aluminum AL 6082, and wherein the base portion is made of metal, wherein the metal is die-cast aluminum AL EN AB 46100.

18. The video camera assembly according to claim 1, wherein the support element has a substantially discoidal shape.

19. The video camera assembly according to claim 1, wherein the closing wall is made of polymeric material, and the polymeric material is ASA-PC.

20. The video camera assembly according to claim 1, wherein the shaft comprises two or more portions of different sizes, and in which the first bearing and the second bearing are engaged to adjacent portions of the shaft.

* * * * *